Jan. 8, 1935.　　　　　L. U. EYERLY　　　　　1,987,004
AMUSEMENT DEVICE
Filed April 10, 1934　　　2 Sheets-Sheet 1
FIG. 1.
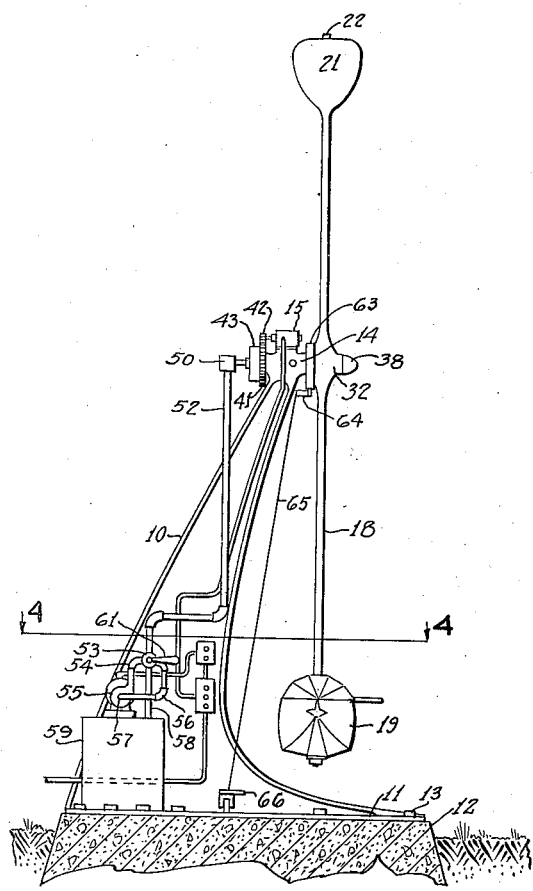
FIG. 2.
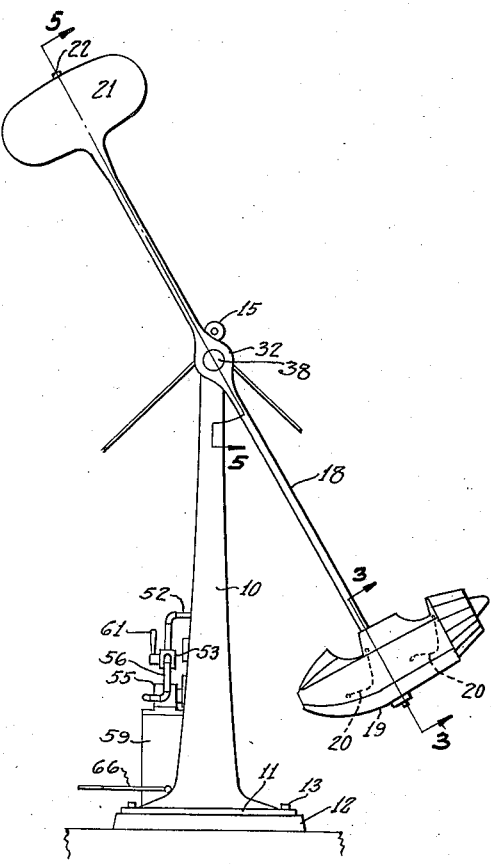
FIG. 4.
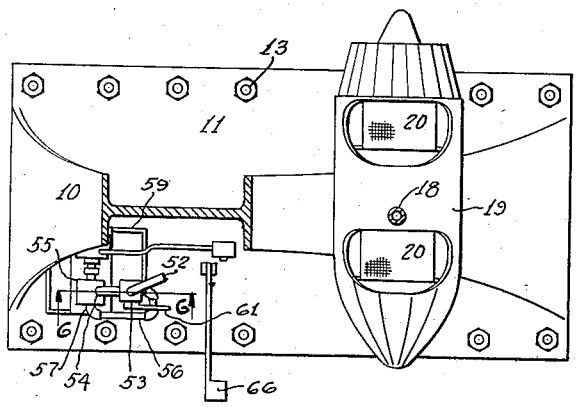
FIG. 3.
INVENTOR
L. U. EYERLY
BY
ATTORNEY

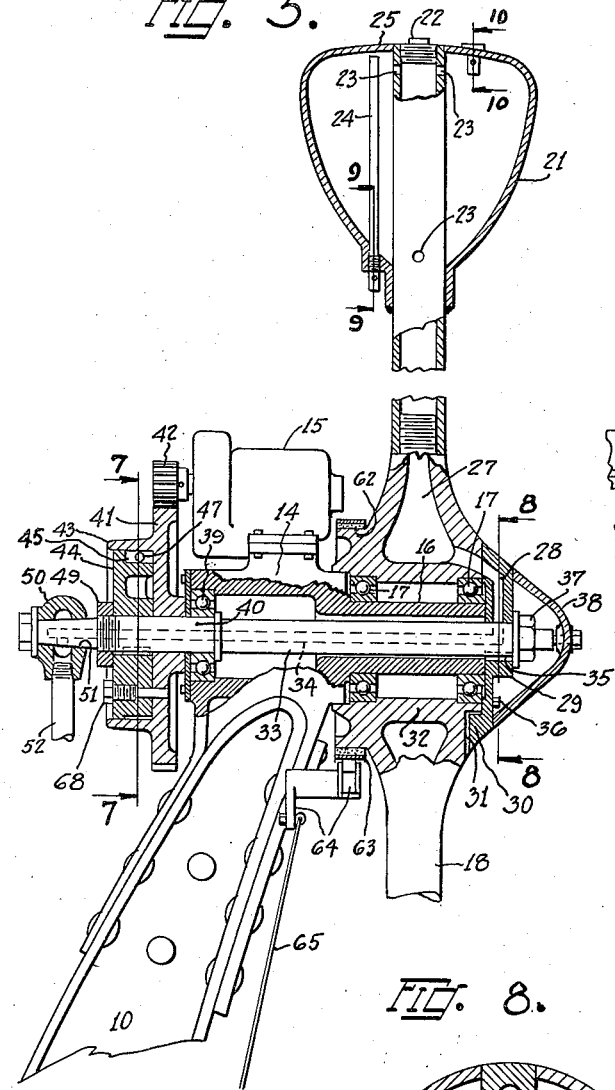

Patented Jan. 8, 1935

1,987,004

UNITED STATES PATENT OFFICE 1,987,004

AMUSEMENT DEVICE

Leaman U. Eyerly, Salem, Oreg.

Application April 10, 1934, Serial No. 719,874

4 Claims. (Cl. 272—49)

This invention relates generally to amusement devices, and particularly to one which enables the user to experience sensations similar to those experienced in looping-the-loop in an airplane.

The second object is to produce an amusement device for the purpose stated, which will be easy to construct and can be operated by an unskilled person without danger to the occupants thereof.

These, and other objects, will become more apparent from the specification following as illustrated in the accompanying drawings, in which:

Fig. 1 is a side elevation of the device.

Fig. 2 is a front elevation.

Fig. 3 is a section taken along the line 3—3 in Fig. 2.

Fig. 4 is a section taken along the line 4—4 in Fig. 1.

Fig. 5 is a section taken along the line 5—5 in Fig. 2.

Fig. 6 is a section through the balance control valve.

Fig. 7 is a section taken along the line 7—7 in Fig. 5.

Fig. 8 is a section taken along the line 8—8 in Fig. 5.

Fig. 9 is a section taken along the line 9—9 in Fig. 5.

Fig. 10 is a section taken along the line 10—10 in Fig. 5.

Similar numbers of reference refer to similar parts throughout the several views.

Referring in detail to the drawings, there is shown an upright standard 10 whose base 11 is secured to a foundation 12 by means of bolts 13. At the top of the standard 10 is mounted a housing 14 upon which is mounted the motor 15.

From the housing 14 projects the horizontal sleeve 16 on which are placed the anti-friction bearings 17 which rotatably support the elongated arm 18. On one end of the arm 18 is attached the car 19 having seats 20 for passengers. The other end of the arm 18 carries a balancing tank 21. The arm 18 is tubular in form and is closed at its outer end by means of the plug 22. Communication between the arm 18 and the balancing tank 21 is afforded by the openings 23.

The breather pipe 24 extends from the innermost end of the tank 21 to a short distance from its outermost end 25. The pipe 24 is provided with a check valve 26 (as shown in Fig. 9). This valve opens while the tank 21 is filling.

The inner end of that portion of the arm 18 which communicates with the tank 21 is connected by means of a passageway 27 to the passageway 28 in the driving disk 29, whose key 30 occupies a recess 31 in the hub 32 of the arm 18.

The horizontal shaft 33 has a coaxial opening 34 which communicates with the passageway 28. The shaft 33 is secured to the driving disk 29 by means of the key 35. The disk 29 is secured to the hub 32 by means of the bolts 36. A nut 37 is placed on the end of the shaft 33 outside of the disk 29. A hub cap 38 conceals the nut 37.

The shaft 33 journals in the anti-friction bearing 39 which is also supported by the housing 14. The end 40 of the shaft 33 carries a gear 41 which is rotatable with relation to the shaft 33 and meshes with the pinion 42 of the motor 15. The gear 41 is provided with a drum 43 within which is placed an over-rolling clutch disk 44 in whose recesses 45 are placed the wedges 46 which are urged in the direction of their pointed ends by means of the springs 47.

The disk 44 is secured to the shaft end 40 by means of a key 48. The nut 49 holds the disk 44 in place. A water connection 50 provided with a tapered seat 51 admits water from the pipe 52 to and from the tank 21 through the passageways 34, 28 and 27. The pipe 52 is connected to the four-way balance control valve 53, one of whose ports connects by means of a pipe 54 with the discharge side of the pump 55. A second port connects by means of a pipe 56 with the suction side 57 of the pump 55. The remaining port of the valve 53 connects by means of a pipe 58 with the water reservoir 59.

The rotor 60 of the valve 53 is controlled by means of the hand lever 61. A brake drum 62 is formed on the hub 32 and is encircled by a brake band 63 which is actuated by the levers 64 and the rod 65 through the foot pedal 66.

An air valve 67 is provided in the outer side 25 of the tank 21 for the purpose of admitting air to the tank 21 to replace the water being drawn through the openings 23 to the reservoir 59. The valve 67 is shown in detail in Fig. 10.

In order to make it possible to vary the manner of operating the device there is provided an easily removable pin 68 by means of which the disk 44 can be secured to the gear 41, thereby keeping the operation of the arm 18 entirely under the control of the motor 15. In this event, however, it is possible to operate the device without shifting the water balance, but if so used the motor 15 must be reversible. In other instances the tank 21 is replaced by means of a second car 19 which itself acts as a balance.

The operation of the device is as follows: Assuming that it is used as a single car machine with a variable counterbalance, the valve 53 is turned as in Fig. 6 so that water is discharged from the reservoir 59 to the tank 21, assuming of course that the passengers have taken their position within the car 19, and that the pump 55 is operated. The motor 15 is now started and the car 19 made to revolve about the horizontal axis of the shaft 33 until the desired speed is attained.

Since the device is practically in a state of balance very little effort is required to secure its rotation, but when the car 19 is up to speed the lever 61 is turned to connect the pipe 52 with the pipe 56, and the pipe 54 with the pipe 58, thereby withdrawing the water from the tank 21 and returning it to the reservoir 59.

The device is now in a state of unbalance and while the momentum of the car, together with the turning effect of the motor 15, is sufficient to carry it upwardly past its center it is permitted to swoop downward without restraint from the motor 15 by reason of the clutch mechanism between the gear 41 and the shaft 33, it being assumed, however, that the pin 68 is not now in position.

If it is desired to operate the device without releasing it from the motor 15 the pin 68 is put into place (as shown in Figs. 2 and 7) and the machine may be operated with or without the water balance.

I claim:

1. An amusement device comprising a standard having an arm rotatably attached thereto on a horizontal axis, a car rigidly secured to the outer end of said arm, and means for revolving said car in a circular orbit within a vertical plane.

2. An amusement device consisting of an upright standard having a horizontal shaft at the upper end thereof, an arm on said shaft substantially normal thereto having a car rigidly attached to the outer end thereof, and a motor including gearing for revolving said shaft for the purpose of causing said car to travel in a circular orbit within a vertical plane.

3. An amusement device consisting of an upright standard having a horizontal shaft at the upper end thereof, an arm disposed on opposite sides of said shaft having a car rigidly attached to one end thereof and a counter-balance at the other, means for varying the action of said counter-balance, and means for applying a rotary movement to said shaft.

4. A device as described in claim 3, together with a clutch adapted to permit said motor to be driven in only one direction.

LEAMAN U. EYERLY.